April 24, 1934.  H. SINGER  1,956,456
AUTOMATIC CAMERA
Filed Nov. 10, 1931   2 Sheets-Sheet 2
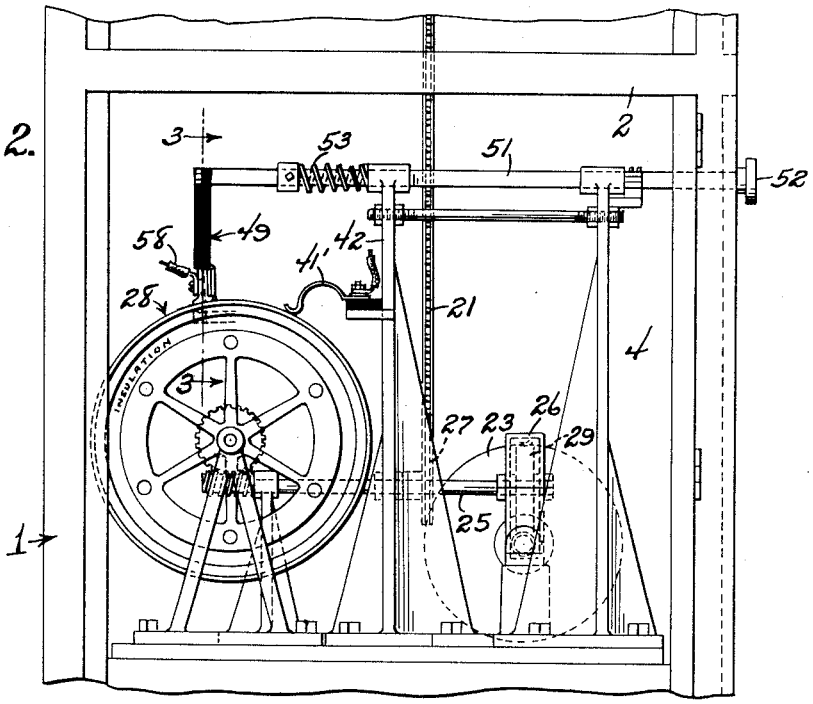
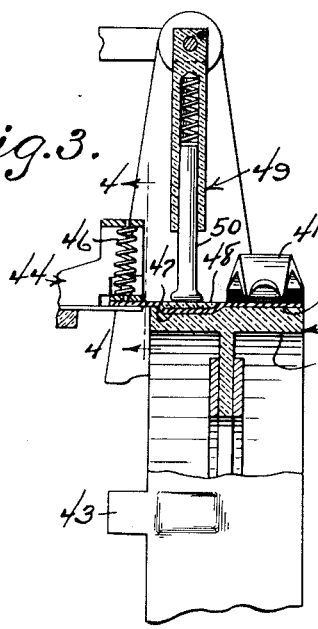
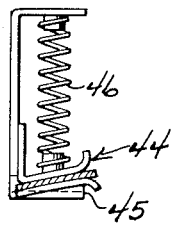
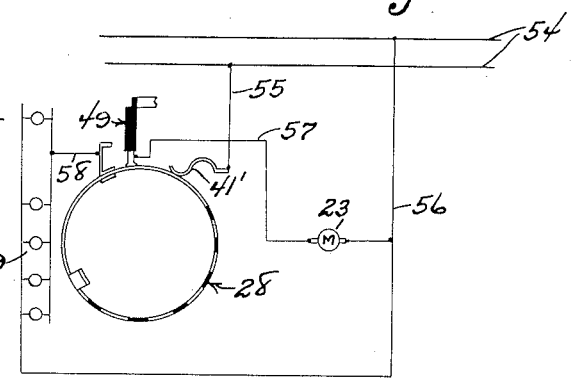
Harry Singer INVENTOR
BY Victor J. Evans & Co.
ATTORNEY Patented Apr. 24, 1934

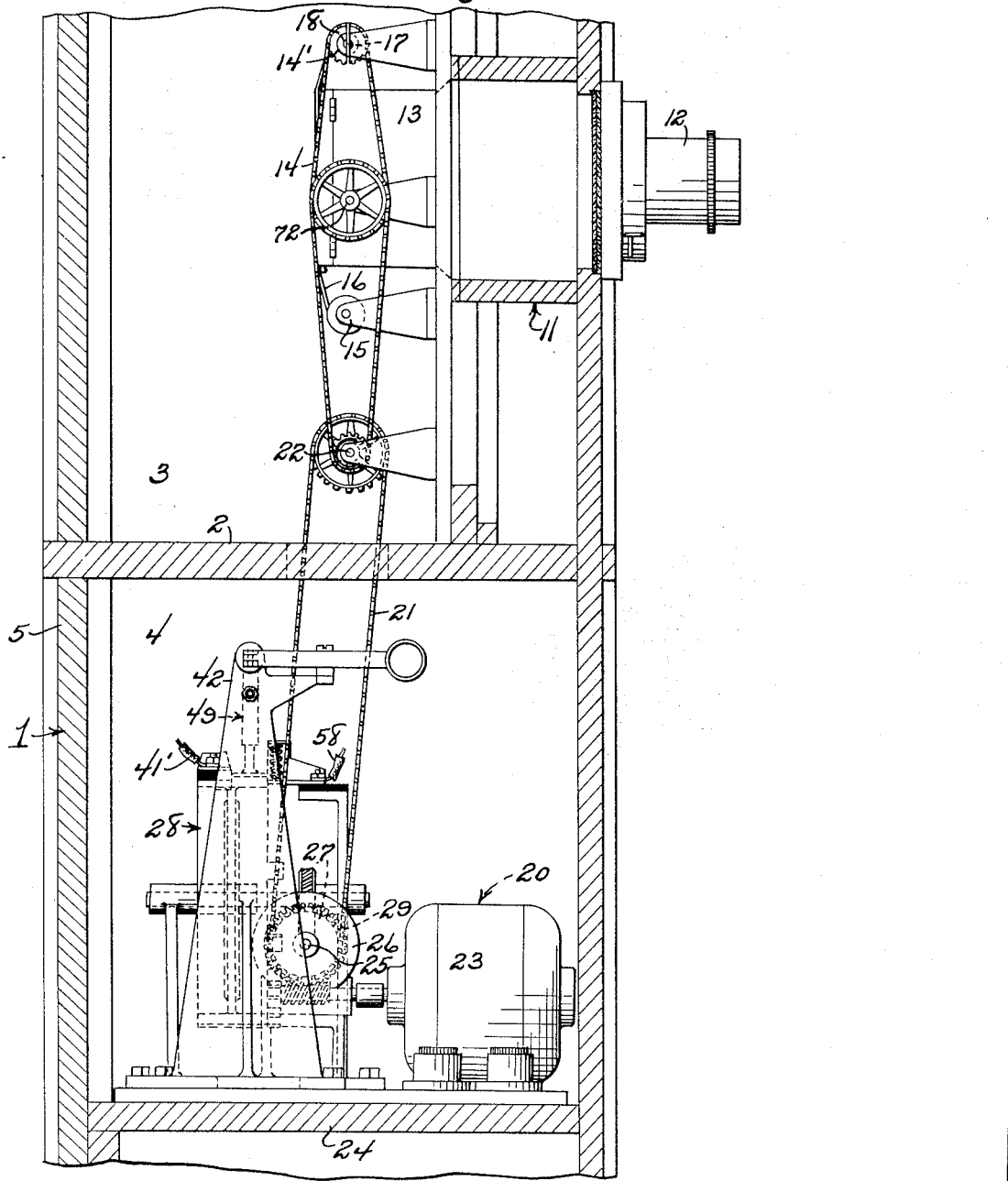

1,956,456

UNITED STATES PATENT OFFICE 1,956,456

AUTOMATIC CAMERA

Harry Singer, Dorchester, Mass.

Application November 10, 1931, Serial No. 574,177

2 Claims. (Cl. 95—31)

This invention relates to cameras especially adaptable for permitting persons unskilled in the art of photography to take pictures of portrait size, and has for the primary object, the provision of a device of the above stated character whereby films in roll form may be successfully employed and after each exposure, the film may be moved to position the next film ready for exposure by a power actuated means set in operation manually and automatically stopped after each adjustment of the film.

Figure 1 is a fragmentary sectional view illustrating a camera constructed in accordance with my invention.

Figure 2 is an enlarged fragmentary rear elevation with the cover or closure of the case removed to show the mechanism for winding the film from one roll to another.

Figure 3 is a sectional view taken on the line 3—3 of Figure 2.

Figure 4 is a detail sectional view taken on the line 4—4 of Figure 3.

Figure 5 is a diagrammatical view illustrating the wiring diagram for the illuminating means and the automatic control therefor.

Referring in detail to the drawings, the numeral 1 indicates a casing divided by a partition 2 to provide upper and lower compartments 3 and 4 and said compartments are normally closed by removable rear doors or walls 5.

The upper compartment 3 has built therein a camera construction 11 including the usual lens and shutter mechanism 12 associated with the front wall of the casing 1. The camera construction 11 also includes a film holder 13 provided with a removable cover 14. Upper and lower spool holders 14' and 15 are associated with the film holder 13 and the lower spool holder 15 removably receives the film roll 16 which is fed through the film holder 13 to a receiving spool 17 carried by the upper spool holder 14' and operatively connected to a power shaft 18. The power shaft 18 is driven from a power means 20 located in the lower compartment through a series of sprocket chains 21 and shafts 22 as clearly shown in Figure 1.

The power means includes an electric motor 23 mounted on a suitable platform 24 in the lower compartment and is connected to a power shaft 25 by reduction gears 26 and one of the sprocket chains 21 is connected to the power shaft 25 by a sprocket gear 27.

Electric lamps 39, as shown in Figure 5 of the drawings, may be mounted on the casing 1 adjacent the combined lens and shutter mechanism 12 for illuminating the object to be photographed and are automatically controlled by the circuit breaker 28 and are adapted to be illuminated when the camera is at rest with a film positioned ready for exposure.

The circuit closer 28 comprises a tubular shell of conductive material and indicated by the reference character 40 and is mounted upon a drum 41 rotated by the power shaft 25. A spring contact 41' engages the shell 40 and is carried by a support 42 mounted on the platform 24. The shell 40 is provided with a series of extensions 43 projecting beyond one edge of the drum 41 for the purpose of forming movable contacts for the electric lamps 39 and during the rotation of the drum are adapted to move into and out of engagement with the contact 44. The contact 44 is mounted upon a support carried by the platform 24 and includes spaced elements 45 between which the contacts 43 move and engage. One of the elements 45 is spring pressed as shown at 46. The drum 41 is preferably constructed of a suitable insulating material and the shell 40 at spaced intervals is provided with pockets or indentations 47 in which is located a non-conductive material 48 to provide dead contacts on the periphery of the shell 40 and which are arranged in alignment with certain of the contacts 43. The dead contacts 48 are preferably seven in number, six of which correspond to the number of films in a roll while the other dead contact represents the neutral or non-operative position of the circuit closer.

A control contact 49 rides upon the periphery of the shell 40 and also into and out of engagement with the dead contacts 28 and when in engagement with any one of said dead contacts, the circuit to the electric motor 20 is broken. The control contact 49 is preferably in the form of a spring pressed plunger 50 carried by an operating shaft 51 slidably mounted in supports on the platform 24 and extends through the front wall of the casing 1 and is provided with a finger piece 52. The operating shaft 51 is mounted for a limited sliding movement and is returnable to its normal position when released by a spring 53.

Electrical feed lines 54 are shown in Figure 5 and one of said feed lines is electrically connected to the contact 41' by a conductor 55 and the other feed line is connected to the electric lamps 39 and also to the electric motor 23. The electric motor 23 is connected to the control contact 49 by a conductor 57. The contact 45 is connected to the electric lamps 39 by a conductor 58.

A roll of films is positioned in the camera mechanism to have the first film moved into a position for exposure and the operator pulls on the finger piece 52 to shift the control contact 49 off the dead contact and into engagement with the shell 40 completing an electric circuit to the motor 23 and the latter continues to operate until the next dead contact is engaged by the control contact 49. This operation causes the film to be wound onto the receiving spool and to position the first film ready for exposure. One of the contacts 43 is then in engagement with the contacts 35 completing an electric circuit to the electric lamps 39 so that the object to be photographed will be efficiently illuminated. The operator then actuates the shutter mechanism in the usual manner. After the first exposure is made, the operator then pulls on the finger piece 52 shifting the control contact 49 off the dead contact onto the shell whence the circuit to the electric motor is again completed causing the motor to wind the exposed film onto the receiving roll and to position number two film ready for exposure in the camera mechanism. This operation is continued until the sixth film has been exposed and the motor continues to operate after the exposure of the sixth film for the purpose of winding the entire paper and film onto the receiving spool and is automatically stopped after the complete winding of the film by the control contact 49 coming in engagement with the seventh dead contact. When the control contact is in engagement with the last named dead contact the circuit to the electric lamps 39 is broken. It is also to be noted that the circuit to the electric lamps 39 is broken each time the film roll is moved by the power mechanism and the circuit to said electric lamps restored when the device has come to rest with the next film positioned ready for exposure.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A camera including a film holder having film rollers to support and move a film and an electric motor having a circuit, drive means between the film holder and the motor, a rotatable drum driven by the motor, a contact band electrically connected in the circuit and mounted on the drum and having spaced pockets, insulation mounted in said pockets to form spaced contacts of the band, and a control contact element engaging the band and electrically connected to said circuit for opening and closing the circuit to the motor after each manual operation of the element for effecting movement of the film by said motor.

2. A camera including a film holder having film rollers to support and move a film and an electric motor having a circuit, drive means between the film holder and the motor, a rotatable drum driven by the motor, a contact band electrically connected in the circuit and mounted on the drum and having spaced pockets, insulation mounted in said pockets to form spaced contacts of the band, a yieldable contact element engaging the band, and electrically connected to said circuit, and an operating rod supporting said contact element for a limited movement relative to said contact and the insulation for starting the motor after each operation of the motor to impart a step by step movement to the film.

HARRY SINGER.